United States Patent [19]

Moll

[11] 4,016,494

[45] Apr. 5, 1977

[54] SATELLITE COMMUNICATION SYSTEM WITH IMPROVED CONFERENCE FACILITY

[75] Inventor: Edward W. Moll, Norristown, Pa.

[73] Assignee: General Electric Company, Fairfield, Conn.

[22] Filed: Nov. 11, 1975

[21] Appl. No.: 630,773

[52] U.S. Cl. .................................. 325/15; 325/4; 325/52; 325/53; 179/170.2; 343/177

[51] Int. Cl.$^2$ ........................................ H04B 7/00

[58] Field of Search ........ 179/18 BB, 18 BC, 41 A, 179/170.2, 170.6; 325/3, 4, 5, 15, 17, 25, 52, 53, 55, 63; 343/200, 175, 176

[56] References Cited

UNITED STATES PATENTS

| | | | |
|---|---|---|---|
| 2,861,128 | 11/1958 | Metzger | 325/5 X |
| 3,548,106 | 12/1970 | Watson | 325/53 X |

Primary Examiner—Benedict V. Safourek
Attorney, Agent, or Firm—Allen E. Amgott; Raymond H. Quist

[57] ABSTRACT

Gross, U.S. Pat. No. 3,842,350, teaches satellite communication system in which subscribers are connected to each other by appropriate assignment of two different transmitting frequencies to two parties, each being assigned a receiving frequency matching other's transmitting frequency. When third party (in commonest case, operator) must communicate with both subscribers, prior art requires operator to have as a minimum two receivers whose outputs are mixed to operator headset and two transmitters fed from operator microphone. One pair of operator transmitter and receiver communicates with one subscriber, the other pair communicates with other subscriber; but subscribers can not communicate with each other. This is somewhat inconvenient for operator intervention and, of course, intolerable if a conference connection is required. A conference facility may be provided by cross connecting the output of each receiver to its opposite transmitter via a conference bridge which also includes the operator headset and microphone. With such an arrangement, in the general case, intelligence from the first party passes up to the relay, down from the relay to the operator position, through the conference bridge, up to the relay from the operator position, and down to the second party. There are thus two up-and-down "hops" to the relay; these produce a delay which is subjectively very objectionable. This prior art method, whether or not a conference bridge is employed, also requires changing of frequency assignments each time the operator enters the conversation, which incurs some time delay. Present invention teaches provision of second receiver tuned to operator transmitting frequency, at both subscriber positions, the operator having only a single transmitter, but having two receivers tuned to the respective transmitting frequencies originally assigned to the subscribers for communication between them. Thus operator intervention does not interrupt conversation between subscribers, and time for necessary setting of receiver and transmitter frequencies is confined to those for operator communication. The basic principle may be expanded to generalized conference calls among any number of parties.

2 Claims, 4 Drawing Figures

SATELLITE COMMUNICATION SYSTEM WITH IMPROVED CONFERENCE FACILITY

BACKGROUND OF THE INVENTION

1. Field of the Invention.

This invention pertains to communication systems in which different stations are selectively connected to each other by frequency selection, particularly such systems in which a satellite-borne relay is employed; and it deals specifically with improvement in the art by which more than two stations are commonly connected.

2. Description of the Prior Art.

U.S. Pat. No. 3,842,350, of Gross, assigned to the assignee of this application, is incorporated herein by reference. The Abstract of this patent reads as follows:

"Ground terminal serving a number of individual telephone lines in a local region converts their signals to an intermediate frequency without regard to whether called station is in same local region or in remote region linked by relay satellite. Switching equipment routes remote region calls to up-frequency converter link to satellite, and local region calls to intermediate-frequency bus for connection to local region called line. Intermediate-frequency switching system thus replaces conventional combination of standard telephone exchange for local region calls plus separate switching system for ground link to relay satellite, with economy in equipment for appropriate mix of local and remote traffic."

According to the disclosure of that patent, each subscriber station (or trunk) is provided with a trunk access unit (abbreviated for convenience to its acronym TAU) which comprises a modulator and a transmitting IF oscillator whose frequency may be adjusted by control signals from a routing controller, and a demodulator with a receiving IF oscillator whose frequency may also be adjusted by control signals from a routing controller. Thus each subscriber station may be assigned a transmitting intermediate frequency, and a different receiving intermediate frequency; complementary frequency assignments to a second subscriber station will effectively connect the two subscriber stations together, via a common channel which may include a satellite-borne relay. It is to be noted that only a single receiving channel is provided for each TAU, although this may be tuned to any frequency in its design range.

U.S. Pat. No. 3,617,644, of Boag, teaches a demand-assigned system employing a satellite link; it may best be described by its own abstract:

"Communication paths between a plurality of earth stations on a demand assignment basis are provided. Each participating station transmits a carrier that is received by all other stations and identifies the transmitting station. A remote station is called by transmitting the remote station calling frequency or address via the local carrier. The remote station then detects its address frequency on the local station carrier and automatically locks onto the channel carrying signals received from the local station. The remote station then transmits the signal frequency or address of the local station via the remote station carrier. When the address is received at the local station, it automatically locks onto the channel carrying signals received from the remote station, thereby providing a communication circuit (two-way communication path) between the calling and the called stations. Each participating station sends out a busy signal during the entire time it is in use. The busy signal from any one station is received by all other stations and prevents the calling of a busy station." His specification is directed to communication between exchanges, rather than individual subscriber telephones; and he states specifically (column 1, lines 55 through 58) "During the time in which the circuit interconnection is provided between a pair of exchanges they cannot communicate with any other exchanges in the pool." U.S. Pat. No. 3,110,773, of Miller, attacks the problem of providing service to incoming calls in order of their seniority, with further provision for giving priority to certain designated calls. However, each ground station has certain frequencies transmitting to a relay on a satellite permanently assigned to it; and it receives all communications relayed from the satellite except its own. It does not employ switching by frequency assignment; it aims at solving the priority or queuing problem which it assumes to exist because of the limited number of satellite channels available to any given station. It does indicate an operator position which permits the operator to communicate with any subscriber line but by conventional land-line connection to the subscriber.

U.S. Pat. No. 3,564,147, of Puente et al., discloses a way of permitting plurality of ground stations to select available relay channels. However, it is stated at column 3, lines 73 through 75: "The function of a telephone central and telephone centrals per se are well known in the art and they constitute the location and/or apparatus wherein calls are received and routed." It is thus evident that operator communication with any subscriber line is by conventional land-line connection; individual subscriber lines are not connected by frequency selection; only the exchanges are connected by satellite-borne relay.

U.S. Pat. No. 3,789,142, of Shimasaki et al., is concerned with a timedivision multiplex system in which a switching matrix on board a satellite switches information bursts occurring at different times to antennas appropriately directed to send each burst to the ground station for which it is intended. There is no suggestion of switching of individual subscriber lines by any means other than the obvious one of a standard telephone exchange connected to a ground station.

The preceding references, except for Gross cited at the beginning, are all that were found by a professional searcher. It is evident that none of them deals with a system in which individual subscriber lines are switched by frequency assignment, and hence none of them even encounters the problem of permitting a third party to intervene in a conversation between two subscribers connected together by frequency assignment as Gross teaches. Gross does not teach such intervention although he does teach switching by frequency assignment.

SUMMARY OF THE INVENTION

When two subscriber positions are connected together by frequency assignment to their trunk access units as represented in FIG. 1, TAU 1 will transmit at an assigned transmitting frequency T1 to TAU 2 which receives at a corresponding receiving frequency R1, which will ordinarily be identical with T1. TAU 2 transmits at an assigned transmitting frequency T2, and TAU 1 receives this at its assigned receiving frequency R2, which will ordinarily be idential with T2. If, as Gross discloses, frequency assignment is used to switch together two subscriber stations at the same ground location, T1 and R1 will be identical. However, if only relayed calls are so switched, there may be a constant difference between T1 and R1. This possibility is immaterial for the general purpose of this summary.

If now an operator is to intervene in the call represented by FIG. 1, the prior art represented by FIG. 2 requires that the operator be provided with two TAUs 3 and 4. It is assumed that the original transmitting frequencies T1 and T2 of TAUs 1 and 2, respectively, are left unchanged. TAU 3 is assigned a receiving frequency R1 and TAU 4 is assigned a receiving frequency R2, so that the operator will be able to receive from TAU 1 and TAU 2. TAU 3 is assigned a transmitting frequency T3, and TAU 2 is assigned a matching receiving frequency R3; and TAU 4 is assigned a transmitting frequency T4, and TAU 1 is assigned a matching receiving frequency R4. Thus the operator (whose headset may be fed the received outputs of TAU 3 and TAU 4, mixed) can hear from both TAU 1 and TAU 2; and the operator's microphone (which may feed both TAU 3 and TAU 4 transmitting modulators) will permit speaking to TAU 1 and TAU 2; but TAU 1 and TAU 2 can no longer hear each other's transmissions directly. The conference bridge shown between TAU 3 and TAU 4 can tie the output of R1 to the input of T4, and the output of R2 to the input of T3 (simultaneously feeding the outputs of R1 and R2 to the operator headset and the output of the operator microphone to T3 and T4) so that the parties at TAU 1 and TAU 2 can hear each other, but only at the expense of a double up-and-down transit to and from the relay (a double "hop") whose increased delay is most disturbing—probably more so because the operator's voice is heard with the smaller delay produced by a single "hop". If the TAU 3 and TAU 4 of the operator's position are connected via satellite relay SR, four relay channels will be used during the operator's intervention, as contrasted with the two required if only TAU 1 and TAU 2 are in conversation.

FIG. 3 represents schematically the arrangement of units in accordance with the present invention. Each TAU is made "special" by the addition of a second receiver; but the operator's position requires only a single such TAU. For distinction from the ordinary TAU, the special TAUs will be represented by the acronym STAU. STAU 1, in addition to the transmission of T1 and receipt of R2 (which TAU 1 performed) can also receive R3; and similarly STAU 2 transmits T2 and receives R1 as did TAU 2, but it also receives R3. TAU 4 has been eliminated, double relay connection ("hops") has been eliminated, and STAU 3 can transmit T3, which STAU 1 and STAU 2 can receive simultaneously, and can receive R1 and R2. Since only three transmitting frequencies are used, it is obvious that only three relay channels will be used. It is also evident that each STAU can receive transmission from the other two, and the operator may enter the communication without causing any delay or interruption in communication between the subscribers at STAUs 1 and 2. It is not required that all TAUs in a system be replaced by STAUs. Many calls, for example dialed station-to-station calls from non-coin telephones, are not of such nature that they require operator intervention under any circumstances. These can be routed through the TAU's disclosed by Gross. But person-to-person calls, or calls from coin telephones require operator supervision; and the former, at least, may originate at any subscriber station. Thus it is not feasible to provide STAU's as such to every subscriber who may need more than two-way communication, because the number who will need it at any one time is statistically small. The actual manner of carrying out my invention is preferably by providing extra receivers which can be switched into any TAU's audio output. This has the advantage that it permits conference calling by any number of parties without the undesirable delay caused by double relay connections ("hops") so long as each is provided with sufficient extra receivers. In the preferred embodiment to be described under that heading, it is taught to include echo suppression in a multiple-receiver system.

DESCRIPTION OF THE PREFERRED EMBODIMENT

Figure 4:
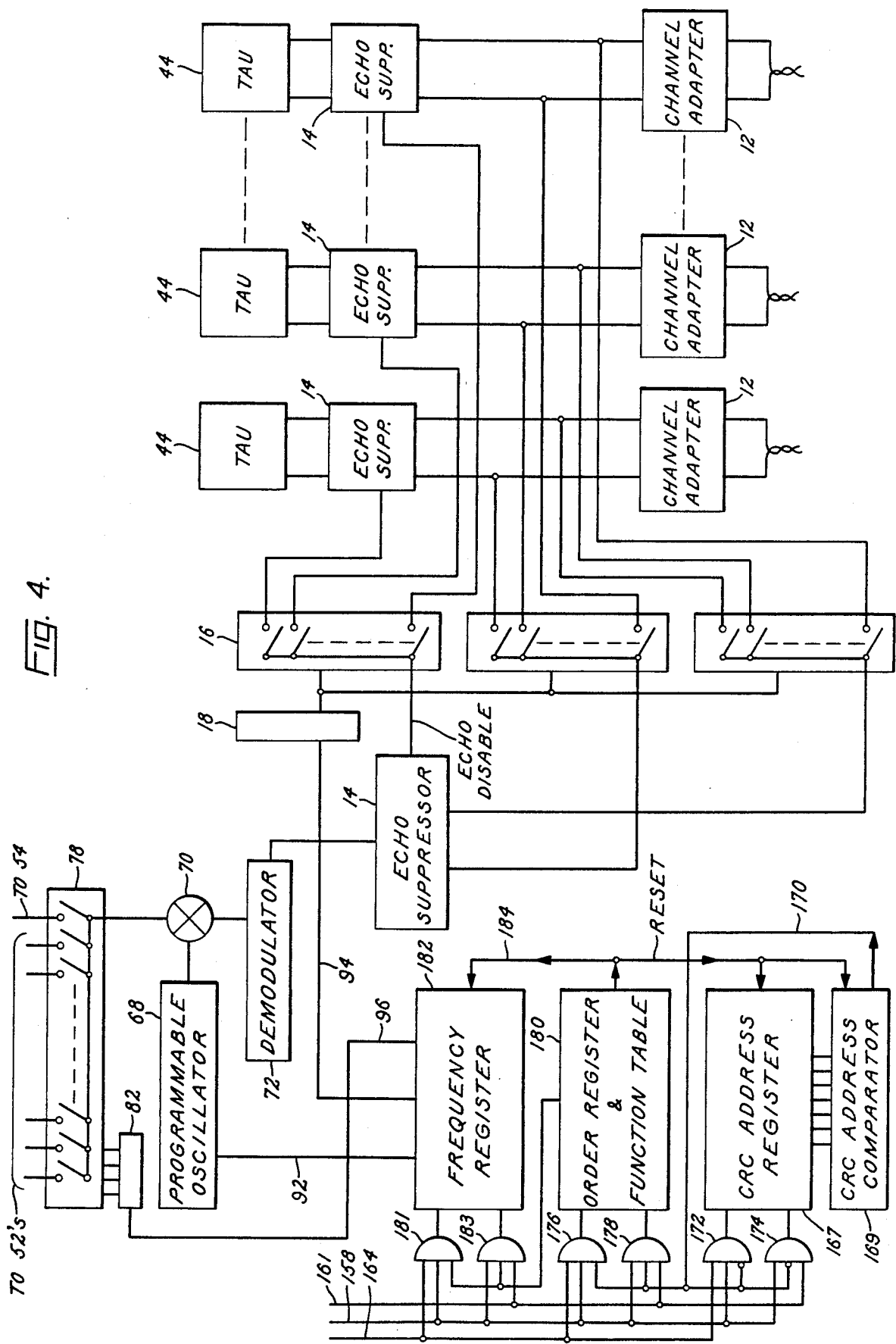
FIG. 4 is a representation of the preferred embodiment of the present invention in connection with the invention of Gross taught in U.S. Pat. No. 3,842,350.

FIG. 4 represents a preferred embodiment of the present invention in the environment of the system of Gross. Because Gross is incorporated by reference and has 8 figures and 12 columns of description of its preferred embodiment, so far as practicable the reference numbers of Gross will be used to identify those components which are or may permissibly be identical with those of Gross; it is believed that this will facilitate cross-reference to the Gross patent. The origin of such items in the Gross reference will be specifically stated so that no confusion will result.

Figure 1:
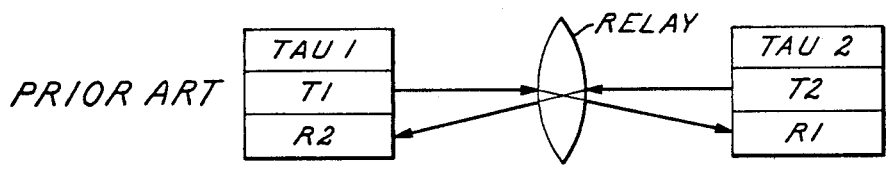
FIGS. 1 and 2 are symbolic diagrams of the prior art.
Figure 2:
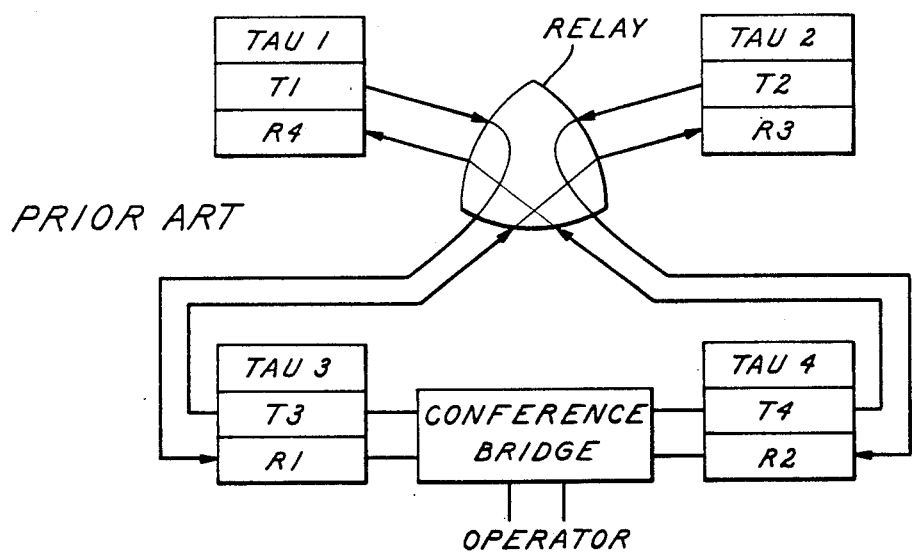

Three TAUs 44 of Gross' FIG. 2 are represented, indicative of the entire plurality of such units at a primary office earth station (POES). Each is provided with a channel adapter 12 for connecting the audio input and output of a TAU 44 to the subscriber trunk line. Such an adapter is referenced briefly in Gross (column 6 line 68 through column 7 line 4) but since it is a standard item (commonly provided by telephone operating companies) it was not represented in his drawings. Between each TAU 44 and its channel adapter 12 there is represented an echo suppressor 14. Echo suppressors are also part of the prior art; U.S. Pat. No. 3,906,172 of Barnes and Hoeschele, assigned to the assignee of the present application, discusses the art in general, and (being issued Sept. 16, 1975) is representative of the modern art status. Echo suppression ameliorates the deficiencies in trunk circuits which Gross' invention serves. Imperfect termination of such trunk circuits produces reflection of signals moving to the termination so that they are heard, with delay, as echoes. Such delayed signals are extremely disturbing to the speaker, even to producing physiological reactions. Echo suppressors, in general, interrupt the path to the speaker's ear whenever the amplitude of the echo is objectionably high. Since this is determined by the relative level of the echo and the signal being fed into the trunk toward its termination, the echo suppressor 14 is connected to both the audio output and audio input channels of its TAU 44.

Figure 3:
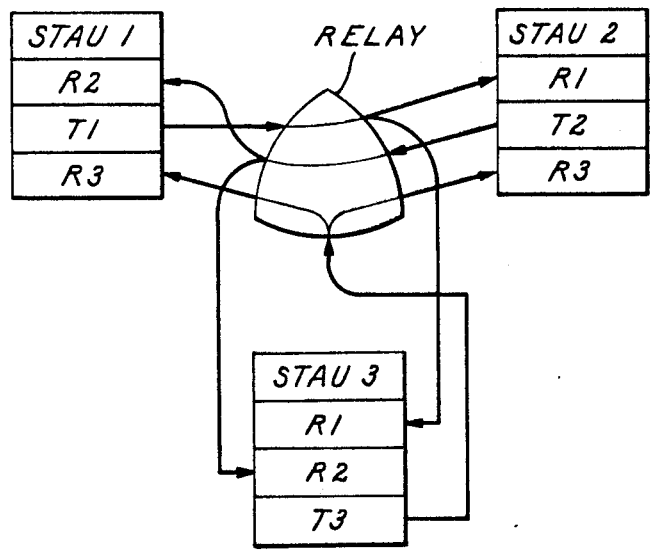
FIG. 3 is a symbolic diagram of the schema of the present invention.

At the left of FIG. 4 there is represented substantially FIG. 5 of Gross. References 92, 94, 96, 158, 161, 164, 170, 172, 174, 176, 178, 180, 181, 182, 183, and 184 are the same as in Gross FIG. 5. However, TAU address register 166 of Gross has been changed to CRC address register 167 and TAU address comparator of Gross has been changed to CRC address comparator 169. This is purely verbal in that in Gross these items operate to identify the address of a TAU; in the present instance they operate to identify the address of a conference receive channel. Similarly, in Gross the outputs of frequency register 182 are used to operate a distributor select switch 78 and a summer select switch 76, and to set operating frequencies of a receiving local oscillator 68 and a transmitting oscillator 66, as represented in Gross' FIG. 3. In the present FIG. 4, references 68, 70, 72, 78, 82, and channels 92 and 96 are identical with those in Gross' FIG. 3; they constitute essentially the receiving half of a TAU. Switch 78 will connect product detector 70 to any IF distributor and programmable oscillator 68 will operate at any frequency to select a channel within the distributor range, as commanded by signals from frequency register 182. This is identical with the functioning of the same elements in the TAU 44 of Gross. However, the present invention teaches feeding the audio output of demodulator 94 to an echo suppressor 14 and connecting three terminals of the echo suppressor to three terminals at any TAU 44 to be served by the invention. This requires a signal to control a multi-position switch; but fortunately the TAU 44 of Gross provides such a signal at conductor 94 from the frequency register 182 of his FIG. 5, which in its pristine application controls multiposition switch 76. In the present FIG. 4, multi-position three-pole switch 16 is connected to tie the three terminals of echo suppressor 14 (input, output, and echo disable) to the corresponding terminals of any echo suppressor 14 connected to any TAU 44. A register 18 is represented connected to receive a control signal over conductor 94 and store it and provide control outputs to switch 16 to select the desired position of it. Reference to poles and positions is, of course, convenient but archaic reference to mechanical switches, to describe the properties of switches which will by present art be semiconductors— probably integrated circuits.

The manner of use of the conference recieve channel is primarily one of sending control signals to it. The CRC is assigned an address similar in form to that of a TAU; the receiving channel assignments of the CRC are identical with those for a TAU. However, that part of an order which would select a summer for the intermediate-frequency output of a TAU is, in the CRC, devoted to selecting the position of switch 16 which is connected to the TAU to be provided with conference connection. As a practical matter the number of TAU's to be thus selectible may be so large that more bits will be needed for register 18 than are normally included in the summer slection order for a TAU. Since there are bits in a standard order for specifying the frequency of programmable oscillator 66 of Gross' FIG. 3 (the intermediate-frequency output oscillator), which are not used in the CRC, these extra bits may be used for extending the range of the order to register 18 of the present FIG. 4.

While a single conference receive channel has been represented, it is obviously possible to provide a multiplicity of them, and to connect a number of them to the same TAU 44 to provide a multi-party conference connection. It is to be noted that this system of interconnection provides echo suppression at the point of reception so that it can suppress any echoes which occur during the transmission over the switching and relaying system, which would presumably not be remediable by improvement of the trunk at the station originating the transmission.

The preferred embodiment here described is economically preferred because it is completely compatible with a system according to the teachings of Gross, and can employ many of the same modules. Obviously, the known art permits many design variations employing the same teachings.

Certain generalizations of terminology are useful for generic description of the invention. The demodulator of the TAU is practically identical with that of the CRC. It appears useful to identify the former as paired, or part of a pair with its modulable oscillator; and the latter as an independent modulator. Tuning of the demodulator is best defined as associated with the frequency of the modulated carrier to be demodulated, rather than the local oscillator frequency. The echo suppressor (as the circuit indications of FIG. 4 show) has three terminals for connection to input and output information, and one "echo disable" which provides the signal that mutually inhibits all the echo suppressor outputs. Other than these definitions, the invention appears definable in ordinary language. Attention is invited to the fact that the word "among" in the last subparagraph of claim 1 may refer to two or more entities, unlike the word "between" which is often considered to be limited to two entities.

I claim:

1. In a system for selective two-way communication between any two pairs of, and comprising a plurality of pairs of:
   a. an oscillator tunable over an operating frequency range and modulable by an intelligence signal input paired permanently with
   b. a demodulator tunable to demodulate a modulated signal in the said operating frequency range and produce an intelligence signal as on output;

and further comprising:
   c. means to establish communication between a first said pair and a second said pair by tuning the modulable oscillator of the first said pair to a first frequency and tuning the demodulator of the first said pair to a second frequency, and tuning the modulable oscillator of the second said pair to the said second frequency and tuning the demodulator of the second said pair to the said first frequency;

the improvement comprising:
   d. at least three independent demodulators tunable to demodulate a modulated signal in the said operating frequency range and produce an intelligence signal as an output;
   e. means to connect the intelligence signal output of each independent demodulator to the intelligence signal output of a paired demodulator;
   f. means to tune each independent demodulator to demodulate a modulated signal at a third frequency different from the said first and second frequencies to which are tuned the modulable oscillator and the demodulator of the pair to whose intelligence signal output the intelligence signal output of the independent demodulator is connected as recited in e);

whereby communication may be established directly among any of the pairs without relaying through any other pair.

2. The improvement claimed in claim 1, in which the said system further comprises:
   g. an echo suppressor having an intelligence input signal terminal, an intelligence output signal terminal, and an echo disable terminal, connected to the intelligence input signal and the intelligence output terminals of each said pair;

and the improvement further comprises:
   h. an echo suppressor having an intelligence input signal terminal, an intelligence output signal terminal, and an echo disable terminal, having its intelligence output signal terminal connected to the intelligence output signal terminal of each independent demodulator; and
   i. means to connect the intelligence input signal terminal and the echo disable terminal of the echo suppressor connected to each independent demodulator to the like identified terminals of the echo suppressor connected to the said pair to whose intelligence signal output the intelligence signal output of the independent demodulator is connected.

* * * * *